United States Patent [19]
Bane

[11] Patent Number: 5,631,636
[45] Date of Patent: May 20, 1997

[54] METHOD OF REDUCING POWER CONSUMPTION IN A REMOTE METER READING SYSTEM

[75] Inventor: Ronald L. Bane, Stone Moutain, Ga.

[73] Assignee: Motorola, Inc., Schaumburg, Ill.

[21] Appl. No.: 698,217

[22] Filed: Aug. 14, 1996

Related U.S. Application Data

[63] Continuation of Ser. No. 205,465, Mar. 4, 1994, abandoned.

[51] Int. Cl.$^6$ ................................................ G08C 17/02
[52] U.S. Cl. ........................ 340/825.69; 340/825.52; 340/870.02; 340/870.03; 379/107
[58] Field of Search ..................... 340/825.52, 825.69, 340/870.03, 870.02, 310.06; 364/145, 483; 379/107; 375/203

[56] References Cited

U.S. PATENT DOCUMENTS

| | | | |
|---|---|---|---|
| 4,506,386 | 3/1985 | Ichikawa et al. | 455/343 |
| 4,577,315 | 3/1986 | Otsuka | 370/95 |
| 4,833,618 | 5/1989 | Verma et al. | 364/483 |
| 4,839,639 | 6/1989 | Sato et al. | 340/825.44 |
| 4,860,005 | 8/1989 | DeLuca et al. | 340/825.44 |
| 4,894,649 | 1/1990 | Davis | 340/825.44 |
| 4,961,073 | 10/1990 | Drapac et al. | 340/825.44 |
| 4,964,121 | 10/1990 | Moore | 370/311 |
| 4,996,526 | 2/1991 | DeLuca | 340/825.44 |
| 5,109,530 | 4/1992 | Stengel | 455/38.3 |
| 5,194,860 | 3/1993 | Jones et al. | 340/870.02 |
| 5,381,133 | 1/1995 | Erhart et al. | 340/825.44 |
| 5,434,911 | 7/1995 | Gray et al. | 379/106 |
| 5,451,937 | 9/1995 | Olson et al. | 340/870.02 X |
| 5,541,938 | 9/1995 | Brennan, Jr. | 340/870.02 X |

FOREIGN PATENT DOCUMENTS

| | | | |
|---|---|---|---|
| 0244384 | 11/1987 | European Pat. Off. | 340/870.02 |
| 0240999 | 9/1989 | Japan | 340/870.02 |
| 4051398 | 2/1992 | Japan | 340/870.02 |

*Primary Examiner*—Brian Zimmerman
*Assistant Examiner*—William H. Wilson, Jr.
*Attorney, Agent, or Firm*—Kenneth M. Massaroni; Andrew S. Fuller

[57] ABSTRACT

A remote meter reading system (10) includes a remotely accessible meter interface unit (12). The meter interface unit (12) is operable in an activated mode and in an inactivated mode. The meter interface unit (12) is periodically activated to monitor a communication channel to detect whether there is communication activity (410). When communication activity is detected (430), the meter interface unit (12) is operated in a message monitoring mode to monitor the communication channel (450, 460). When a message addressed to the meter interface unit (12) is detected during the monitoring period (470), the meter interface unit (12) is placed in an activated mode for an extended time period to process communication signals (485). If no communication activity is detected when periodically activated (430), or if no message addressed to meter interface is detected during the monitoring period (470), the meter interface unit (12) is placed in an inactivated mode (440).

11 Claims, 4 Drawing Sheets

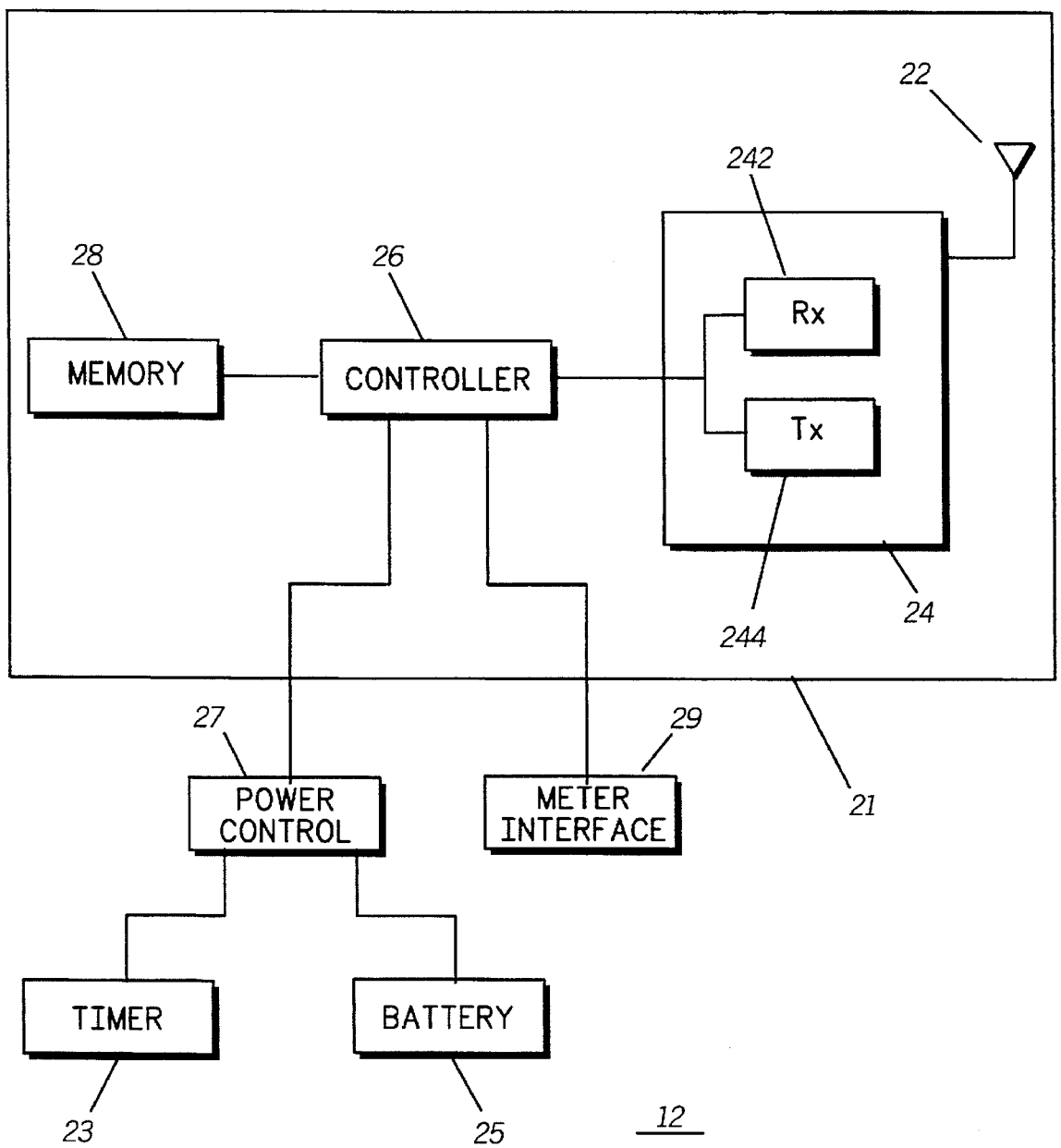

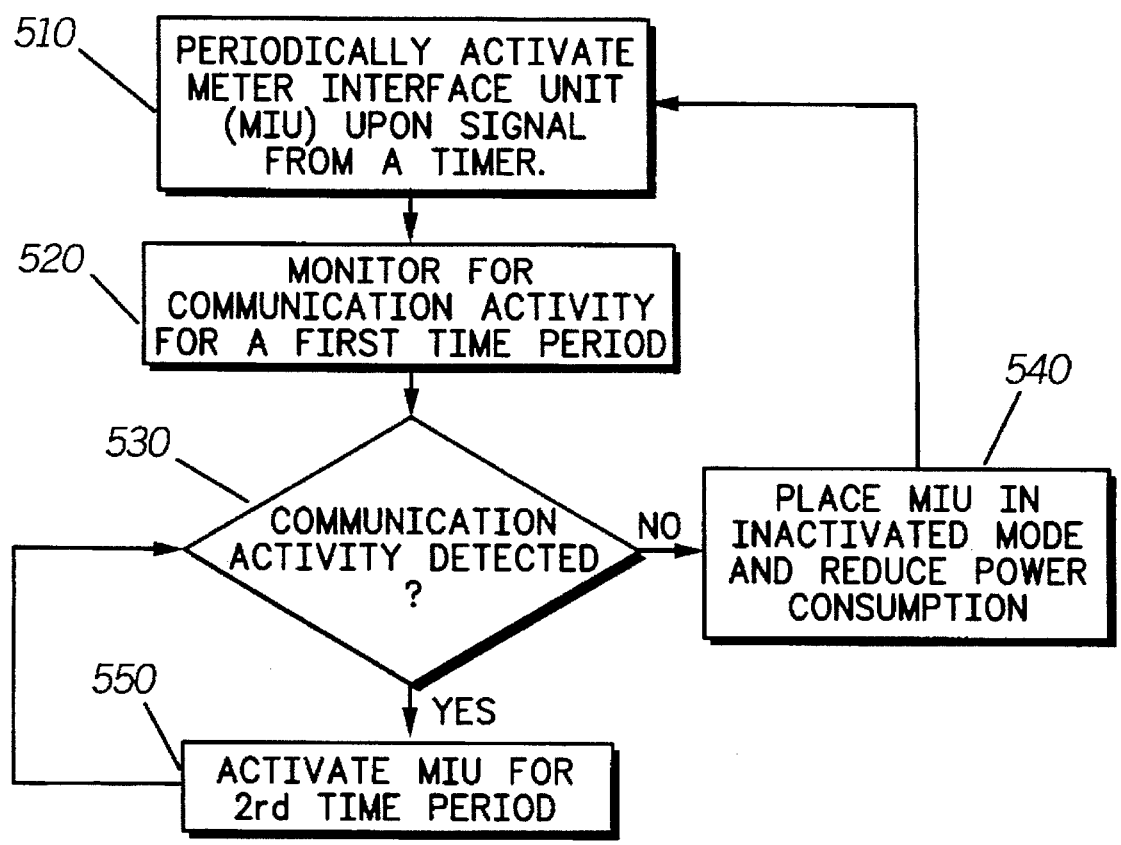

METHOD OF REDUCING POWER CONSUMPTION IN A REMOTE METER READING SYSTEM

This is a continuation of U.S. patent application Ser. No. 08/205,465 filed on Mar. 4, 1994, entitled METHOD OF REDUCING POWER CONSUMPTION IN A REMOTE METER READING SYSTEM, and assigned to Motorola, Inc., now abandoned.

TECHNICAL FIELD

This invention relates in general to remote meter reading, and more particular, to power management in a remote meter reading system.

BACKGROUND

There has been a strong interest on the part of utility companies, and similar entities, to take advantage of modern technology to reduce costs and increase efficiency in the meter reading applications. Traditionally, meters, such as electric, water, and gas meters, have been manually read by physically locating a person at each meter. However, recent developments have provided for meters which can be remotely accessed from a central location through wire or wireless communication links. Oftentimes, these remotely accessible meters have battery powered meter interface devices which can access the meter status information, and which can communicate this information to a remotely situated meter reading device. In such cases, issues associated with power consumption management are an important concern in a remote meter reading system.

In a typical environment, a meter reading system includes a large number of meter installations. Low maintenance meters are desirable to facilitate operating efficiency and to reduce maintenance costs. Therefore, it is desirable to have a meter interface device which can operate for an extended period of time without requiring frequent maintenance for battery replacement and the like. Such maintenance requirements may be reduced by increasing battery capacity or by reducing power consumption. The more viable option of reducing power consumption is usually pursued. For example, the meter interface device may be disabled when there is no ongoing communication with a meter reading device. A trade off is usually made between the availability of the device for communications and the amount of power consumption savings which can be achieved. A meter interface device employing the power consumption saving technique described may have a poor response time if communications availability is not adequate. The impact of poor meter response time is magnified when there is a large number meters to be read. Thus, there must be an acceptable procedure for ensuring that the meter interface device is available when needed.

There exists a need for a meter interface device which can respond to inquiries for meter status information in a time efficient manner. Yet, the meter interface device must provide for power consumption management in order to increase device availability while reducing power supply related maintenance and associated costs.

BRIEF DESCRIPTION OF THE DRAWINGS

FIG. 2 is a block diagram of a meter interface unit, in accordance with the present invention.

FIG. 5 is a flow chart of alternative procedures for reducing power consumption for the meter interface unit of FIG. 2, in accordance with the present invention.

DETAILED DESCRIPTION OF THE PREFERRED EMBODIMENT

Generally, the present invention provides a method of reducing power consumption in a remote meter reading system. The meter reading system typically includes a remote meter reading device, and a group of remotely located meter interface units, and also includes communication link capability between the meter reading device and the remotely located meter interface units. According to the present invention, the meter interface units can alternate between an activated mode and a power saving inactivated mode. While in an inactivated mode there is no communication capability. However, the meter interface units are periodically activated to enable communications capabilities, and during such period, the meter interface units monitor for communication signals initiated by the meter reading device. When a particular meter interface unit detects a message addressed to it during the monitoring period, the meter interface unit enters an activated mode for an extended time period. The activated mode may be extended in response to specific commands from the meter reading device, and for other purposes.

Figure 1:
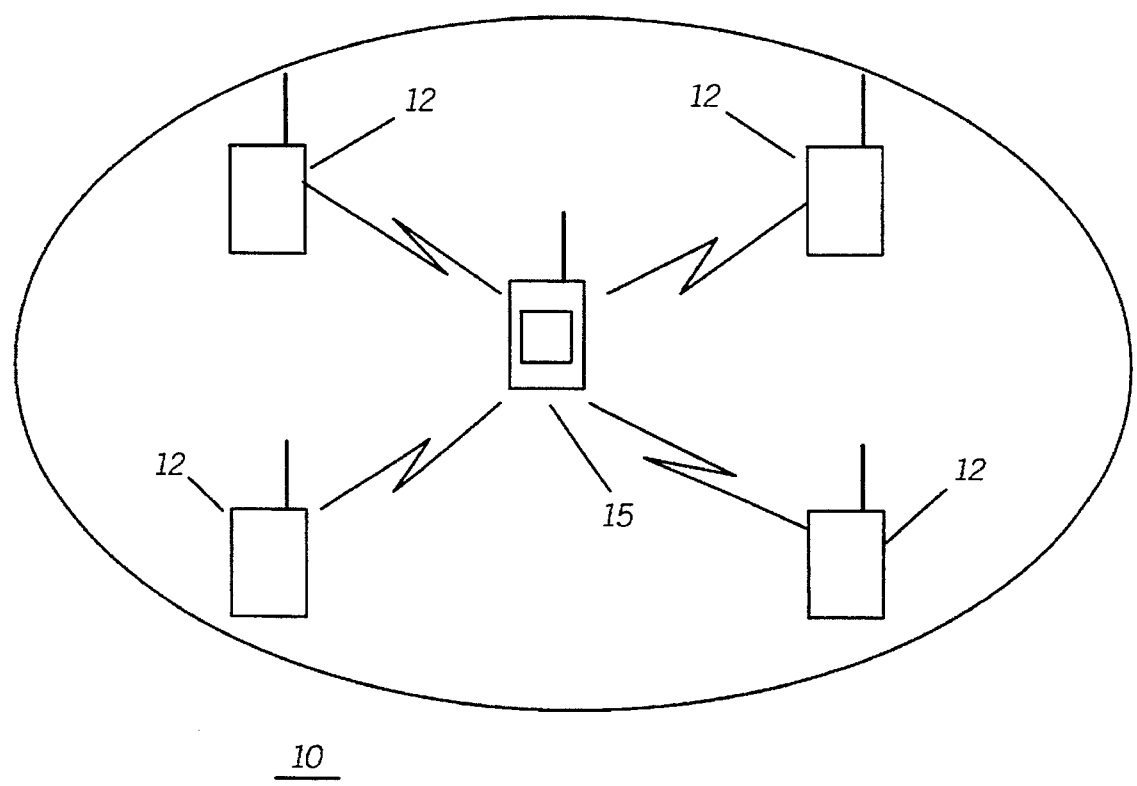
FIG. 1 is a representation of a remote meter reading system, in accordance with the present invention.

The present invention can be better understood with references to FIGS. 1–4. FIG. 1 is a representation of a remote meter reading system 10 in accordance with the present invention. The system includes at least one meter reading device 15, and a group of remotely located meter interface units 12. The meter reading device 15 is situated such that it is in within communication range of the group of meter interface units 12. Referring to FIG. 2, a block diagram of a meter interface unit 12 is shown in accordance with the present invention. The meter interface unit 12 provides an interface for reading a meter, such as an electricity meter, a water meter, a gas meter, and other similar devices. Additionally, the meter interface unit 12 provides remote access to the functions of each meter. The meter interface unit 12 includes a controller 26, a communication portion 21, a meter interface portion 29, and power control portion 27. The meter interface portion 29 provides access to the functions of an electrically coupled meter. The power control portion 27 controls the power supply to the meter interface unit 12 and facilitates the operation of power consumption management.

The communication portion 21 includes a memory block 28, a radio frequency (RF) signal processing block 24, and an antenna 22. The communication portion 21 is capable of receiving and transmitting communication signals over a communication channel, such as a RF channel, using well-known principles. The controller 26 uses logic and other information from the electrically coupled memory block 28 to control the overall operation of the meter interface unit 12. The controller 26 is electrically coupled to the RF block 24 which includes a receiver 242 and a transmitter 244. The RF block 24 is electrically coupled to the antenna 22. For receive operations, communication signals are received by the antenna 22 and are selectively processed by the receiver 242. Similarly, for transmit operations, communication signals are processed by the transmitter 244 and radiated through the antenna 22. The memory block 28 has storage capabilities and can store information received by the meter interface unit 12.

The meter interface unit 12, including the communication portion 21, is operable in an inactivated mode to reduce power consumption. The communication portion 21 is periodically operable in an activated mode to monitor a communication channel for channel activity. The communication portion 21 is activated by power supplied under the control of the power control portion 27. The power control portion 27 responds to a periodic interrupt signal, or activation signal, supplied by an electrically coupled timer 23. Upon receipt of that activation signal, the power control portion 27 supplies power to the communication unit from an electrically coupled battery 25.

The meter interface unit 12 is responsive to messages received over a monitored communication channel. The message may include specific commands which require a response from the meter interface unit 12. These commands include wake-up requests, inactivate requests, and meter reading requests, among others. The meter interface unit 12 responds to a wake-up request by operating in an activated mode for an extended time period. An inactivate request places the meter interface unit 12 in an inactivated power reduction mode. In response to a meter reading request, the meter interface unit 12 communicates with a coupled meter through the meter interface portion 29 to extract status information for the meter.

Figure 3:
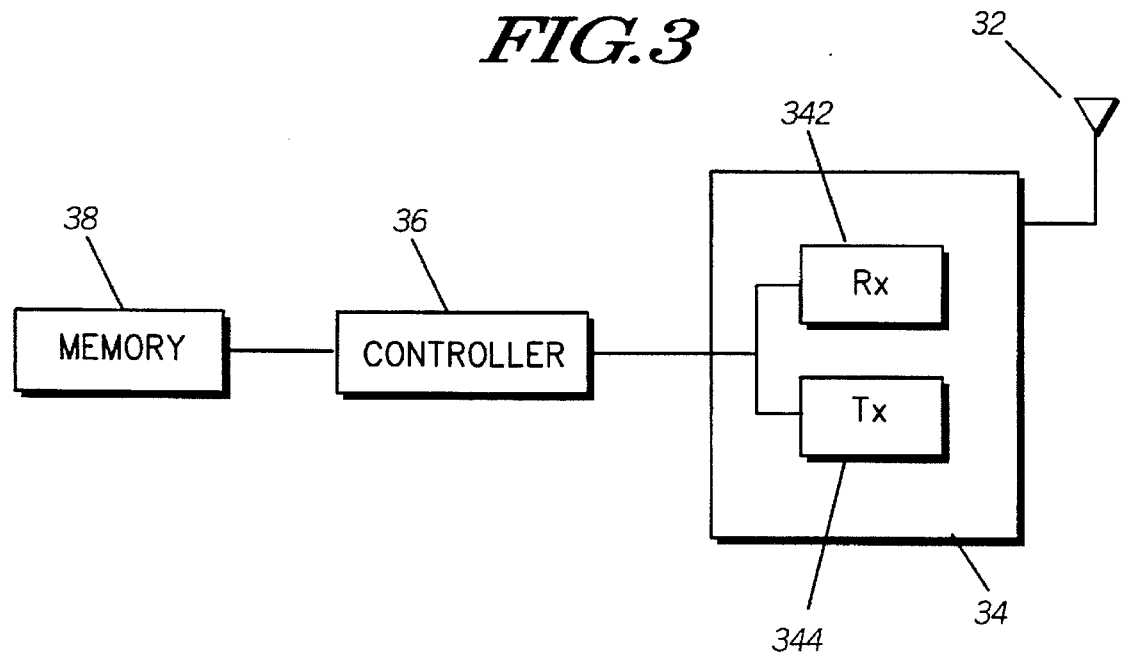
FIG. 3 is a block diagram of a meter reading device, in accordance with the present invention.

Referring to FIG. 3, a block diagram of a meter reading device 15 is shown in accordance with the present invention. The meter reading device 15 has communications capability similar to those described with respect to the meter interface unit 12. Accordingly, the meter reading device 15 has a controller 36, a memory block 38, and a RF portion 34, including a receiver 342 and transmitter 344, for providing two-way communications through an antenna 32. The memory block 38 provides storage capability for the meter reading device 15. Data is stored in the memory block 38 for facilitating the operation of the meter reading device 15. This data may include a list of addresses, or unit identifiers for a group meter interface units 12, and/or other information needed to facilitate the meter reading system 10. Data may be pre-programmed in the meter reading device 15, or the data may comprise information received via the receiver 342. The meter reading device 15 is capable of initiating communication with the group of remotely situated meter interface units 12 over one or more communication channels, such as over radio frequency channels. The meter reading device 15 initiates communications by transmitting commands addressed to a specific or target meter interface unit 12.

Figure 4:
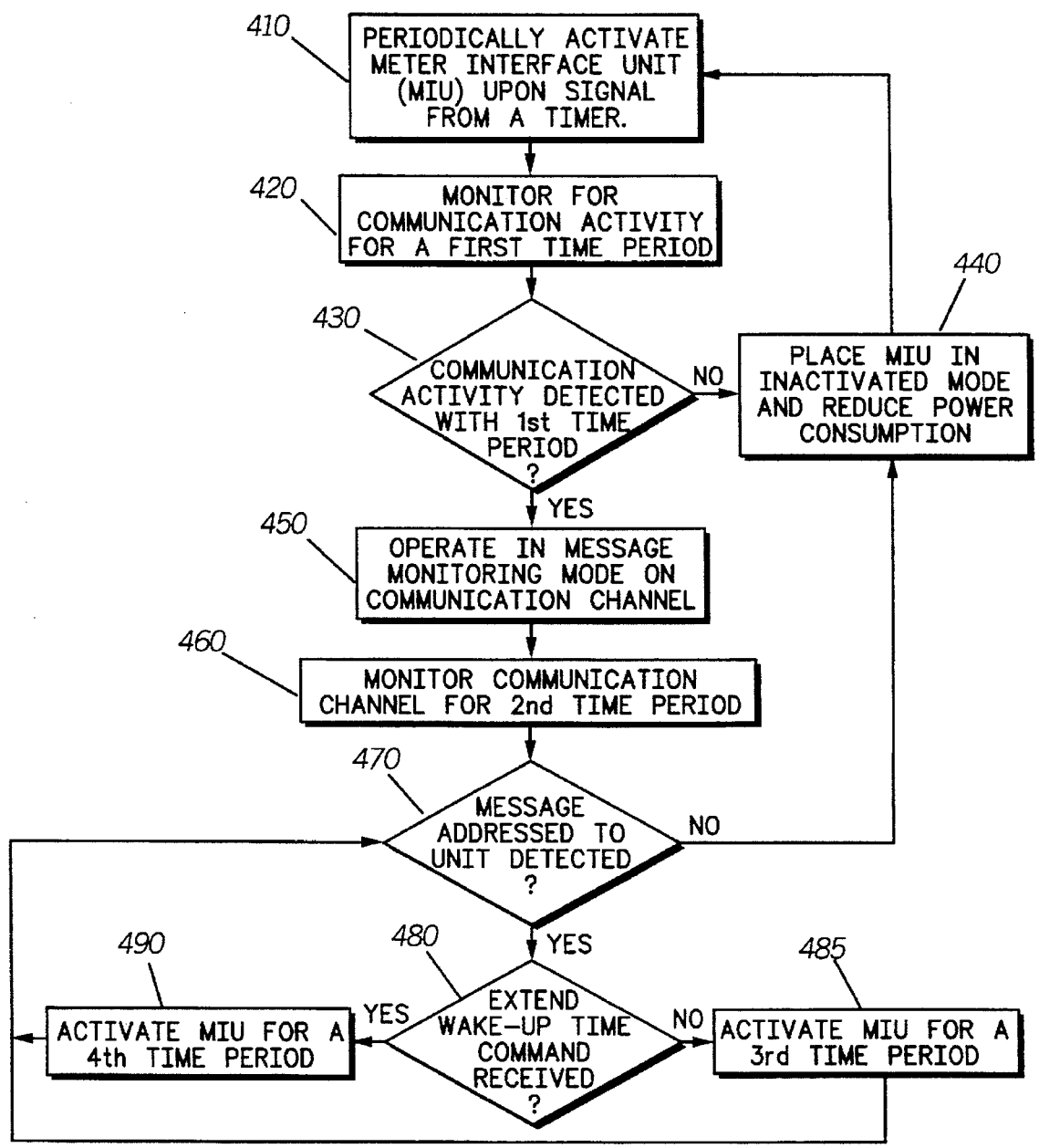
FIG. 4 is a flow chart of procedures for reducing power consumption for the meter interface unit of FIG. 2, in accordance with the present invention.

Referring to FIG. 4, a flow chart of procedures for reducing power consumption for the meter interface unit 12, in accordance with the present invention. The meter interface unit 12 is ordinarily in an inactivated mode when it is not communicating or monitoring for communication signals. From an inactivated mode, the meter interface unit 12 is periodically activated in response to an interrupt signal generated by the timer, step 410. While activated, the meter interface unit 12. monitors a communication channel for a first time period to detect whether there is communication activity, step 420, 430. The first time period is typically of short duration, such as for several milliseconds. In the preferred embodiment, communication activity is detected by monitoring for a carrier signal. Alternatively, the communication channel is monitored for signal transitions at predetermine data rates which indicate the presence of data on the communication channel. Other means of detecting communication activity may be employed. For example, a coded squelch signal or other decodable signal may be used. If no communication activity is detected within the first time period, the meter interface unit 12 is placed in inactivated mode and power consumption reduced, step 440.

When communication activity is detected within the first time period, the meter interface unit 12 begins to operate in a message monitoring mode on the communication channel, step 450. The meter interface unit 12 monitors the communication channel for a second time period to detect whether there is a message addressed to the meter interface unit 12, step 460, 470. If a message addressed to the meter interface unit 12 is not detected within the second time period, the meter interface unit 12 returns to an inactivated power saving mode, step 440. If a message addressed to the meter interface unit 12 is detected, the meter interface unit 12 is placed into an activated mode for a third time period such that the unit 12 is available to process communication signals, step 485. Note that while in the activated mode, the meter interface unit 12 has full communication capability and may receive and respond to communication signals from the meter reading device 15, or may initiate communications with the meter reading device 15. Thus, the meter interface unit 12 may respond to meter reading requests by providing meter status information, including usage information, the date and time the meter was last read, and current power level or battery charge level. There is an implied extension of the time period for remaining in activated or wake-up mode upon the receipt of any message addressed to the meter interface unit 12. Furthermore, the message may be a message to extend activated mode, i.e., a wake-up request. Additionally, the wake-up request may contain a value indicating the duration of extension required, or the extension time period may be predetermined and programmed within the unit 12. Upon receipt of a wake-up request, the meter interface unit 12 is placed in an activated mode for some additional time period, step 490.

Referring to FIG. 5, a flowchart of alternate procedures for reducing power consumption in the meter interface unit 12. As before, the meter interface unit 12 is periodically activated in response to an interrupt signal generated by the timer, step 510. While activated, the meter interface unit 12 monitors a communication channel for a first time period of short duration to detect whether there is communication activity, step 520. When communication activity is detected, step 530, the unit 12 is activated for an extended second time period, step 550. If no communication activity is detected within the first time period, the meter interface unit 12 is placed in inactivated mode and power consumption reduced, step 540. When in activated mode, the meter interface unit 12 is responsive to wake-up requests, meter reading requests, inactivate requests, and other commands as described earlier.

The present invention provides a method for reducing power consumed by a meter interface unit 12 in a meter reading system 10 while making the unit 12 available for communications. In one embodiment, the unit 12 is incrementally brought up to full communications capability, thus offering flexibility in power consumption management, and unit 12 availability. The resultant reduction in power consumed can extend the battery life for a battery powered meter interface unit 12 which can ultimately reduce the maintenance cost for the entire meter reading system 10.

What is claimed is:

1. A method of reducing power consumption in a remote meter reading system, the meter reading system comprising a remotely accessible meter interface unit, the meter interface unit being operable in an activated mode and in an inactivated mode for power consumption reduction, the method comprising the steps of:

periodically activating the meter interface unit to monitor a communication channel for a first time period to detect whether there is communication activity;

operating in a message monitoring mode when communication activity is detected within the first time period, including the steps of:

monitoring the communication channel for a second time period to detect a message addressed to the meter interface unit;

placing the meter interface unit in an activated mode for a third time period to process communication signals when a message addressed to the meter interface unit is detected within the second time period;

placing the meter interface unit in an inactivated mode when a message addressed to the meter interface unit is not detected within the second time period;

placing the meter interface unit in an inactivated mode when communication activity is not detected within the first time period; and operating the meter interface unit in a power reduction mode when in an inactivate mode.

2. The method of claim 1, wherein the step of periodically activating the meter interface unit of the meter from an inactivated mode, includes the step of:

activating the meter interface unit upon receiving a signal from a timer.

3. The method of claim 1, wherein the step of periodically activating the meter interface unit to monitor a communication channel for a first time period to detect whether there is communication activity, includes the step of:

monitoring the communication channel to detect a carrier signal.

4. The method of claim 1, wherein the step of periodically activating the meter interface unit to monitor a communication channel for a first time period to detect whether there is communication activity, includes the step of:

monitoring the communication channel for signal transitions at predetermine data rates which indicate the presence of data on the communication channel.

5. The method of claim 1, wherein the step of operating in a message monitoring mode when communication activity is detected within the first time period, includes the step of:

placing the meter interface unit in an activated mode for a fourth time period to receive communication signals when a message to extend activation mode is addressed to the meter interface unit within the third time period.

6. The method of claim 1, wherein the step of operating in a message monitoring mode when communication activity is detected within the first time period, includes the step of:

placing the meter interface unit in an inactivated mode for a fourth time period when a message to inactivate is addressed to the meter interface unit within the third time period.

7. The method of claim 1, further comprising the step of:

reducing the power consumption of the meter when the meter interface unit is in an inactivated mode.

8. A method of providing power management for a remotely accessible meter having a meter interface unit, comprising:

periodically activating the meter interface unit of the meter upon a signal from a timer;

monitoring the communication channel for a first time period to detect communication activity;

when communication activity is detected within the first time period, placing the meter interface unit in an activated mode for a second time period to receive communication signals; and when communication activity is not detected within the first time period, placing the meter interface unit in an inactivated mode and reducing power consumption.

9. The method of claim 8, wherein the step of operating in a message monitoring mode when communication activity is detected within the first time period, includes the step of:

placing the meter interface unit in an inactivated mode for a third time period when a message to inactivate is addressed to the meter interface unit within the second time period.

10. A method of reducing power consumption for a remotely accessible meter having a meter interface unit, the method comprising the steps of:

periodically activating the meter interface unit to monitor a communication channel for a first time period to detect whether there is communication activity;

operating in a message monitoring mode when communication activity is detected within the first time period, including the steps of:

monitoring the communication channel for a second time period to detect a message addressed to the meter interface unit;

placing the meter interface unit in an activated mode for a third time period when a message addressed to the meter interface unit is detected within the second time period;

placing the meter interface unit in an inactivated mode for a fourth time period to receive communication signals when a message to inactivate is addressed to the meter interface unit within the second time period; and placing the meter interface unit in an inactivated mode when a message addressed to the meter interface unit is not detected within the second time period;

placing the meter interface unit in an inactivated mode when communication activity is not detected within the first time period; and reducing the power consumption of the meter when the meter interface unit is in an inactivated mode.

11. A remotely accessible meter operable in reduced power consumption mode, comprising:

a meter interface unit having a wireless transmitter and having an inactivated mode;

timer means for providing a periodic activation signal to the meter interface unit to place the meter interface unit in an activated mode;

means for monitoring the communication channel for a first time period to detect communication activity when the meter interface unit is in an activated mode;

means for operating in a message monitoring mode when communication activity is detected within the first time period, comprising:

means for monitoring the communication channel for a second time period to detect a message addressed to the meter interface unit;

means for placing the meter interface unit in an activated mode for a third time period to receive communication signals when a message addressed to the meter interface unit is detected within the second time period;

means for placing the meter interface unit in an inactivated mode when a message addressed to the meter interface unit is not detected within the second time period; and means for placing the meter interface unit in an inactivated mode when communication activity is not detected within the first time period;

means for reducing the power consumption of the meter when the meter interface unit is in an inactivated mode.

* * * * *